M. A. Stevens.
Bath Tub.
N° 91,785. Patented Jan. 22, 1869.

Witnesses.
F. Roys
Jeremy W. Blys

Inventor
M A Stevens.

UNITED STATES PATENT OFFICE.

M. A. STEVENS, OF HARTFORD, CONNECTICUT.

Letters Patent No. 91,785, dated June 22, 1869.

IMPROVEMENT IN BATH-TUBS.

The Schedule referred to in these Letters Patent and making part of the same.

*To all whom it may concern:*

Be it known that I, M. A. STEVENS, of the city and county of Hartford, and State of Connecticut, have invented a certain new and useful Improvement in Infants' Bathing-Tubs; and to enable others skilled in the art to make and use the same, I will proceed to describe it, by referring to the drawings, in which the same letters indicate like parts in each of the figures.

The nature of this invention consists in providing a removable rim, having a sacking-bottom secured therein by means of cord and loops. This rim is fitted into the upper portion of a tub, such as are in common use, the object of which is to handle the child with greater care and quietude while bathing or being washed.

In the accompanying drawings—

Figure 1:
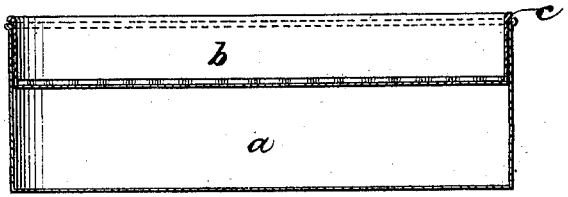
Figure 1 is a side sectional view.
Figure 2:
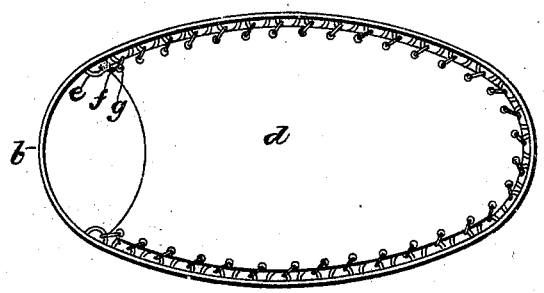
Figure 2 is a top view.

$a$ is a tub, such as is in common use.

$b$ is a rim fitted to the upper portion of the tub $a$. This rim may be made of greater or less depth, as desirable.

The rim $c$ is designed to rest upon the upper edge of the tub $a$.

$d$ is a sacking-bottom, made of any suitable material, and is secured, by means of a lacing-cord, $f$, to the loops $e$ and eyelets $g$, formed in the edge of the bottom $d$.

For convenience' sake, the bottom may be cut short at one end, to allow the hand a passage into the tub below.

By means of this invention, the person having the care of the child can handle it with greater care and less irksomeness, and with less liability of disturbing its tranquillity.

I believe I have thus shown the nature, construction, and advantage of this invention, so as to enable others skilled in the art to make and use the same therefrom.

What I claim, and desire to secure by Letters Patent, is—

The rim $b$, sacking-bottom $d$, with the tub $a$, substantially as described, as an improved article of manufacture.

M. A. STEVENS. [L. S.]

Witnesses:
F. ROYS,
JEREMY W. BLISS.